No. 809,353. PATENTED JAN. 9, 1906.
M. C. ZANGE.
LATHE ATTACHMENT.
APPLICATION FILED MAR. 24, 1905.
4 SHEETS—SHEET 1.
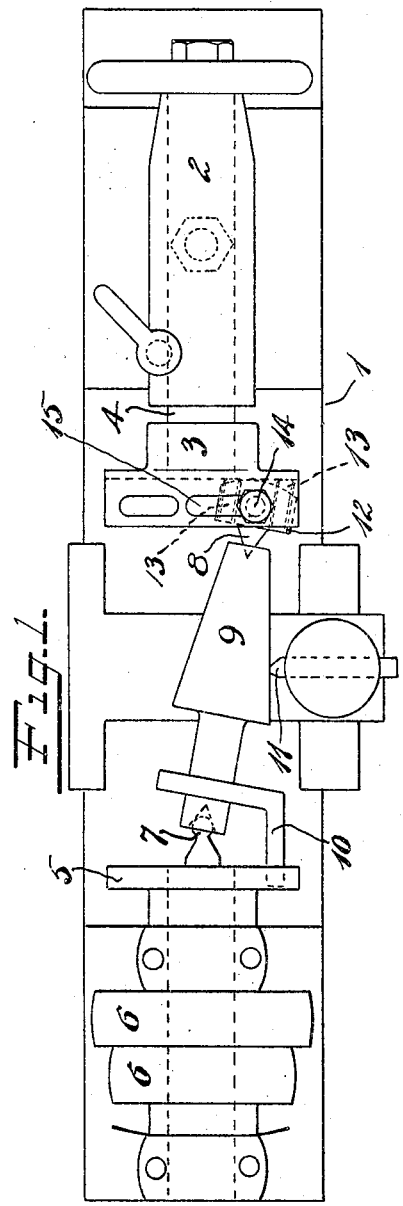
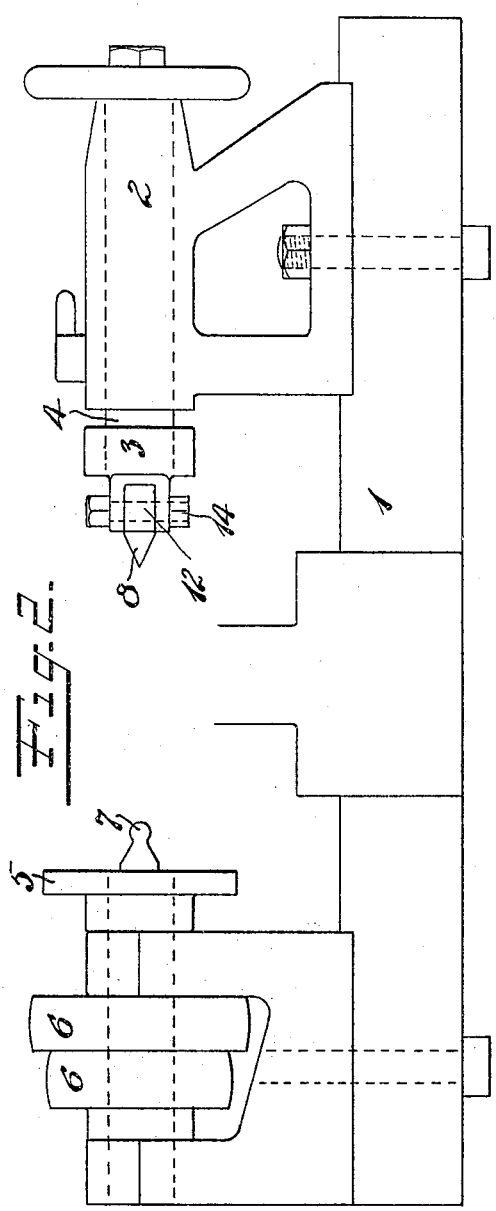
Inventor
Max C. Zange.

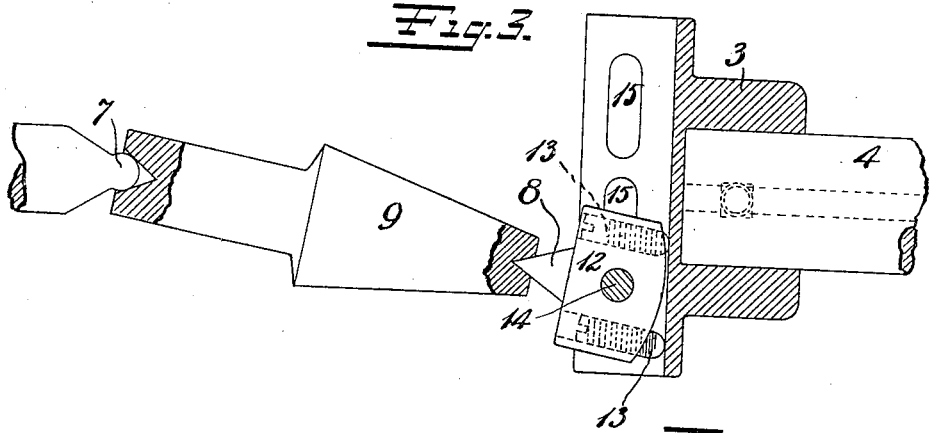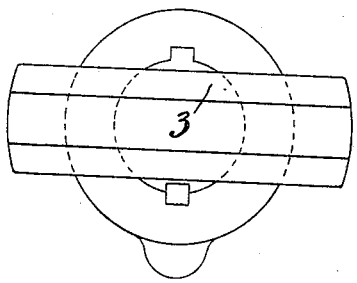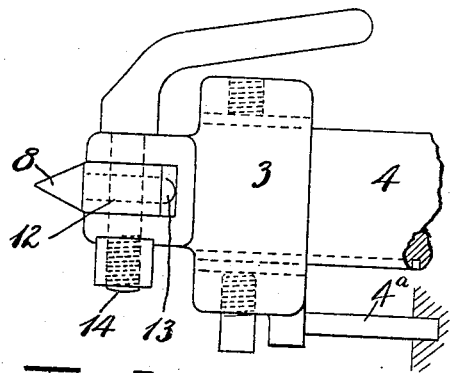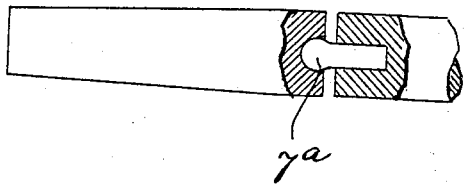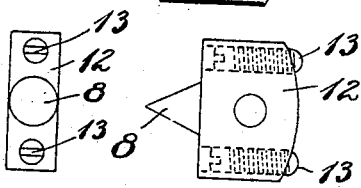

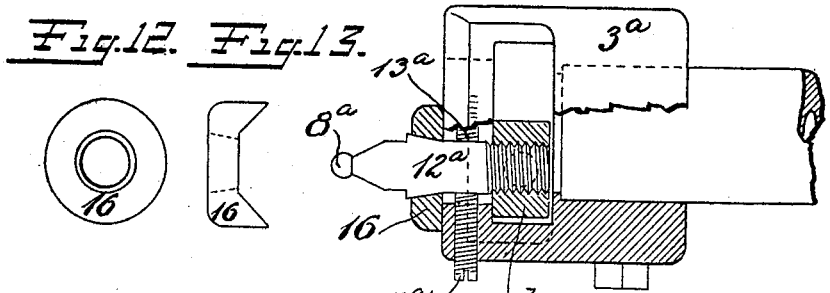
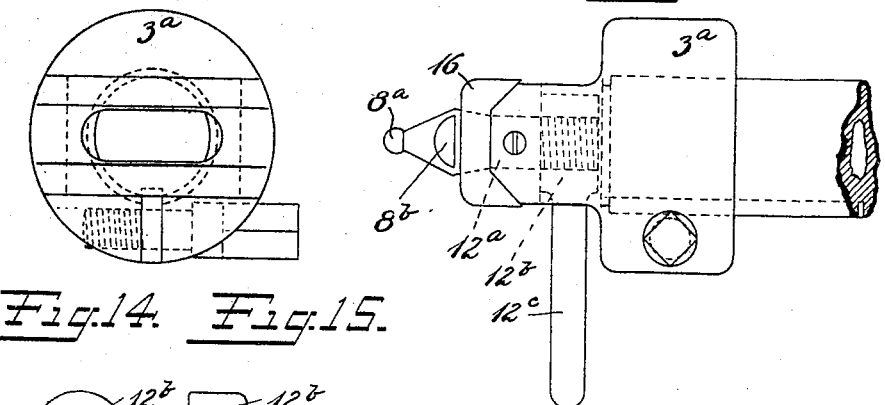
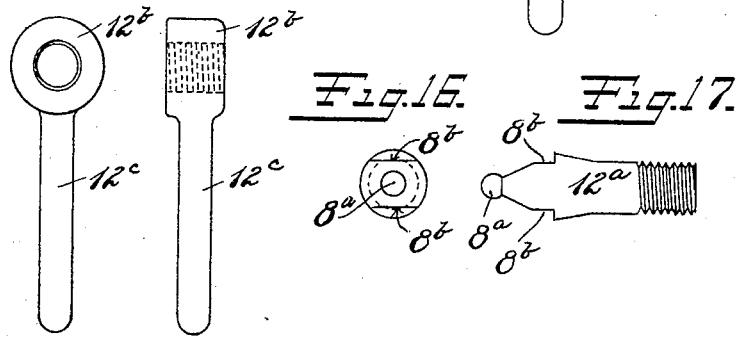
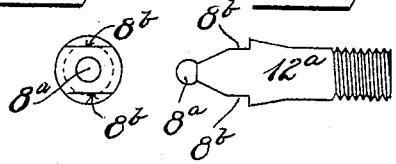

No. 809,353. PATENTED JAN. 9, 1906.
M. C. ZANGE.
LATHE ATTACHMENT.
APPLICATION FILED MAR. 24, 1905.
4 SHEETS—SHEET 4.
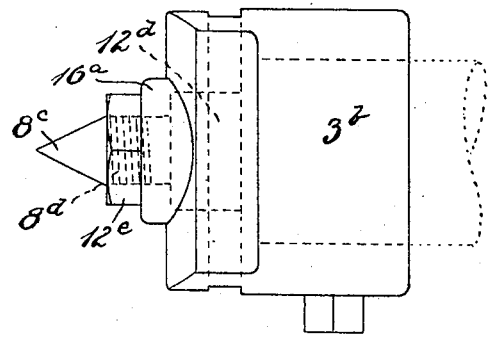
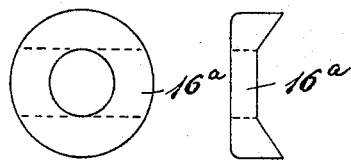
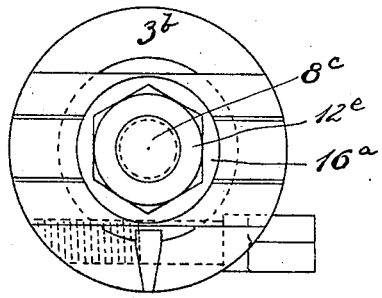
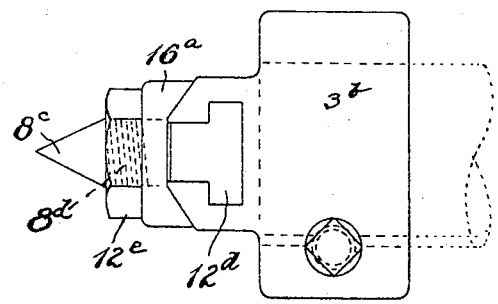
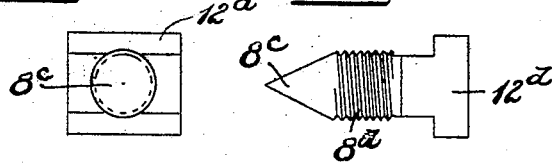
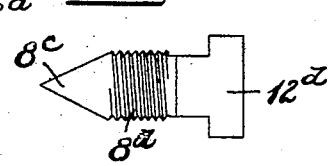

UNITED STATES PATENT OFFICE.

MAX C. ZANGE, OF NEW HAVEN, CONNECTICUT, ASSIGNOR TO EDWARD S. SWIFT, TRUSTEE, OF NEW HAVEN, CONNECTICUT.

LATHE ATTACHMENT.

No. 809,353.  Specification of Letters Patent.  Patented Jan. 9, 1906.

Application filed March 24, 1905. Serial No. 251,735.

*To all whom it may concern:*

Be it known that I, MAX C. ZANGE, a citizen of the United States, residing at New Haven, county of New Haven, State of Connecticut, have invented certain new and useful Improvements in Lathe Attachments, of which the following is a full, clear, and exact description.

My invention relates to lathes, and particularly to an attachment therefor whereby tapered bodies may be turned. Ordinarily to turn tapered bodies in a lathe the "tail-stock," so called, is shifted out of alinement to the desired extent to provide the proper taper cut. Not only is it difficult to ascertain the proper lateral adjustment of said tail-stock when off center, but after the particular work has been completed and it is desirable to restore said tail-stock to its original position a great deal of time and labor is wasted before the necessary perfect adjustment can be effected. By my improvement it is unnecessary to disturb the alinement of the tail-stock, the attachment being secured thereto in such a manner that it (the attachment) may be adjusted laterally relatively to the axis of the tail-stock, so that exactly the proper taper may be cut.

In connection with the attachment I also provide what I term a "live center" to the spindle of the lathe-head, which permits the work to automatically adjust itself to the prescribed axis in the manner hereinafter described.

In the accompanying drawings I have shown my invention as applied to parts of an ordinary foot-power lathe and have illustrated only such parts as are necessary to an understanding of the construction and operation.

Figure 1 is a plan view of the upper part of a lathe with the taper attachment in place as it appears when in use. Fig. 2 is a side elevation thereof. Fig. 3 is a relatively enlarged plan view, partly in section, of certain parts shown in Fig. 1. Fig. 4 is a side elevation of my improved taper attachment assembled, with part of the tail-stock spindle showing. Fig. 5 is an end view of the body of the taper attachment with other parts removed. Fig. 6 is a top view of the swivel and center block-slide detached. Fig. 7 is an end view thereof. Fig. 8 is a modification of what I term a "live-center" bearing. Fig. 9 is a plan view of a modified form of the taper attachment assembled, partly in section, showing part of the tail-stock. Fig. 10 is a side elevation of the attachment shown in Fig. 9 complete. Fig. 11 is an end view of the body of the attachment shown in Fig. 10 with certain parts removed. Figs. 12 and 13 are end and side views, respectively, of a center carrier or slide of the form shown in Figs. 9 and 10. Figs. 14 and 15 are end and side views, respectively, of a clamping device. Figs. 16 and 17 are end and side views, respectively, of the centering device. Figs. 18, 19, and 20 are respectively plan, side, and end elevations of another modified form of my improved attachment. Figs. 21 and 22 are respectively end and side elevations of a slide block or washer used in the attachment illustrated in Figs. 18 to 20. Figs. 23 and 24 are respectively end and side elevations of the adjustable centering device used with the attachment shown in Figs. 18 to 20.

I will first refer to the construction shown in Figs. 1 to 7. 1 is the frame of the lathe. 2 is the tail-stock. 3 is the body of the attachment detachably secured to the tail-stock spindle 4. 5 is the lathe-head, driven in the usual way by the pulleys 6 6. 7 is the bearing center of the spindle of the lathe-head, which is preferably provided with a ball-like end to permit the work to automatically adjust itself as it is revolved about its prescribed axis. 8 represents the center of the adjustable member of my improved attachment. This center is preferably formed by the point of a cone. 9 represents the work mounted between the centers 7 8. 10 is the dog, by which the work is driven from the lathe-head. 11 is the cutting-tool, mounted in the usual manner common to lathes. The adjustable center 8 is mounted on a block 12, which is carried in a suitable guideway in the part 3. This is best seen in Figs. 3, 4, 5. 13 13 are adjusting-screws carried by the center-block 12, whereby it may be tilted to any desired angle to cause the center 8 to line up properly with the work. 14 is a bolt carried by the block 12, arranged to slide in the groove 15 of the body 3 of the attachment, whereby the said center-block 12 may be firmly secured when adjusted. The center 7 may be either as shown in Figs. 1, 2, and 3 or as shown in Fig. 8 at 7ª. In the first instance it is cone-shaped and formed integrally with the spindle. In the second instance it is ball-shaped and separately formed and introduced into a suitable cavity in the end of the block or spindle. Obviously these ball-like center-bearings $7^a$ may be applied on either or both ends of the work.

In Figs. 9 to 17 I have shown another form of the center attachment. In this instance I have also shown a modification in the means for adjusting the center. $3^a$ represents the body of the attachment, slotted at its end to receive the center $8^a$, said center being formed on a short spindle which constitutes the body or block $12^a$. This body is screw-threaded at its rear end and takes into a nut $12^b$, movable in the slot extending transversely of the body $3^a$. 16 is a washer arranged to fit on a tapered portion of the body $12^a$ of the center $8^a$ and also arranged to slide on the edge of the part $3^a$. This washer has tapered sides which wedge on the correspondingly-tapered side edges of the part $3^a$, rendering adjustment of the parts more secure. $13^a$ $13^a$ are adjusting-screws by which the center $8^a$ may be adjusted accurately before the nut $12^b$ is set down or returned to the correct position when desired. The nut $12^b$ may be provided with a handle $12^c$ to facilitate these operations. The opposite surfaces of the shank of the center $8^a$ may be flattened, as at $8^b$ $8^b$, to receive a wrench which will hold said shank revolving while the nut $12^b$ is being set up.

A further modification of the apparatus and means for adjusting the same is shown in the drawings Figs. 18 to 24, inclusive, in which the end of the center-block $3^b$ of the attachment is provided with a T-slot extending transversely of the same and arranged to receive the T-head $12^d$ of the center $8^c$. $8^d$ is a thread on the shank of the center $8^c$, arranged to receive a set-nut $12^e$. $16^a$ is a washer corresponding in function to the washer 16 in Figs. 9 and 10. The nut $12^e$ is located outside of said washer, and when the proper adjustment of the center $8^c$ has been effected said nut may be set down, clamping the inner side of the T-head against the adjacent inner surface of the T-slot and the washer $16^a$ against the outer surface of the body $3^b$, thus securely holding the center $8^c$ in the desired position. $4^a$ is a post projecting from the rear of the body 3 for entering a hole in the body of the tail-stock and taking up twisting strains in heavy work and relieving the spindle of the tail-stock.

These and other modifications will be apparent to the mechanic skilled in the art.

Broadly speaking, the invention will be seen to comprise an attachment which may be secured conveniently to the tail-stock spindle, which attachment is provided with an adjustable center with effective clamping means therefor, whereby when it is desired to turn the tapered body the said center may be adjusted to exactly the right position and the work supported at one end thereby. This eliminates the necessity of disturbing the adjustment of the tail-stock, so that when the work is finished to use the lathe normally it is merely necessary to detach the body 3, $3^a$, or $3^b$ (as the case may be) of the attachment, whereupon the spindle will be found in its original position ready for use.

Many advantages of this attachment not referred to herein will be apparent to the machinist.

While I have used the term "lathe" in describing the machine for which my attachment is adapted, it will be obvious that the term is not limited to a machine of the specific type herein shown and described, but is to be interpreted, broadly, as referring to any machine for cutting, grinding, polishing, &c., tapered surfaces.

What I claim is—

1. An attachment for a lathe comprising a body portion arranged to be secured to the tail-stock spindle, and a laterally-adjustable center carried by the body of said attachment, and means for securing said center coincident with and at various points eccentric to the axis of the tail-stock spindle.

2. An attachment for a lathe comprising a body portion arranged to be secured to the tail-stock spindle, a laterally-adjustable center carried by the body of said attachment, and means for securing said center coincident with and at various points eccentric to the axis of the tail-stock spindle and at various angles relatively thereto.

3. An attachment for a lathe comprising a body portion arranged to be secured to the tail-stock spindle, a laterally-adjustable center carried by the body of said attachment, said center having a ball-like end, and means for securing said center at various points eccentric to the axis of the tail-stock.

4. An attachment for a lathe comprising a body portion arranged to be secured to the tail-stock spindle, a center, a transverse groove in said body portion intersecting said spindle said center being adjustable therein laterally relatively to the axis of said spindle, and means for clamping said center at any point in said groove.

5. An attachment for a lathe, comprising a body portion arranged to be secured to the tail-stock spindle, a transverse guideway in said body portion intersecting the axis of the tail-stock, a laterally-adjustable center mounted thereon, and means for clamping said center coincident with and eccentric to the axis of said tail-stock.

MAX C. ZANGE.

Witnesses:
CHAS. F. COMSTOCK,
MARSHALL LEWIS.